United States Patent
Smith et al.

[19]

[11] Patent Number: 6,128,003
[45] Date of Patent: Oct. 3, 2000

[54] HAND GESTURE RECOGNITION SYSTEM AND METHOD

[75] Inventors: Anthony Vernon Walker Smith, Richardson, Tex.; Alistair Ian Sutherland, Dublin, Ireland; Arnaud Lemoine, Paris, France; Sean Mcgrath, Dublin, Ireland

[73] Assignee: Hitachi, Ltd., Tokyo, Japan

[21] Appl. No.: 08/996,147

[22] Filed: Dec. 22, 1997

[30] Foreign Application Priority Data

Dec. 20, 1996 [EP] European Pat. Off. .............. 96650057

[51] Int. Cl.$^7$ ...................................... G09G 1/16
[52] U.S. Cl. .......................... 345/157; 345/158; 345/156; 345/358
[58] Field of Search .................................... 345/158, 157, 345/156, 358, 326; 348/77; 340/825.19

[56] References Cited

U.S. PATENT DOCUMENTS

| | | | |
|---|---|---|---|
| 5,423,554 | 6/1995 | Davis ....................................... | 273/437 |
| 5,581,276 | 12/1996 | Cipolla et al. ........................... | 345/156 |
| 5,594,469 | 1/1997 | Freeman et al. ........................ | 345/158 |
| 5,598,187 | 1/1997 | Ide et al. ................................. | 345/158 |
| 5,670,987 | 9/1997 | Doi et al. ................................ | 345/156 |
| 5,757,360 | 5/1998 | Nitta et al. .............................. | 345/156 |
| 5,774,591 | 6/1998 | Black et al. ............................. | 382/236 |
| 5,798,758 | 8/1998 | Harada et al. .......................... | 345/339 |
| 5,801,704 | 9/1998 | Oohara et al. .......................... | 345/358 |

FOREIGN PATENT DOCUMENTS

| | | |
|---|---|---|
| 849697A1 | 6/1998 | European Pat. Off. . |
| WO 86/03866 | 7/1986 | WIPO . |

OTHER PUBLICATIONS

A.F. Bobick, et al., "A State–based Technique for the Summarization and Recognition of Gesture", *IEEE*, Publication Date Jun. 6, 1995.

Ishibuchi et al., "Real–Time Hand Shape Recognition Using Pipe–line Image Processor", IEEE International Workshop on robot and Human Communication, 1992, pp. 111–115.

Utsumi et al., "Hand Gesture Recognition System Using Multiple Cameras", Proceedings of ICPR, 1996, Vienna, pp. 667–671.

Azarbayejani et al., Real–Time Self–Calibrating Stereo Person Tracking Using 3–D Shape Estimation from blob Features, Proceedings of ICPR, 1996 Vienna, pp. 627–632.

Ishibuchi et al., "Real–Time Hand Shape Recognition Using Pipe–line Image Processor", IEEE International Workshop on robot and Human Communication, 1992, pp. 111–116.

Deguchi et al., "Visual Servoing Using Eigenspace Method and Dynamic Calculation of Interaction Matrices", Proceedings of ICPR, 1996, Vienna, pp. 302–306.

Grobel et al., "Video–Based Handshape Recognition Using a Handshape Structure Model in Real Time", Proceedings of ICPR, 1996, Vienna, pp. 446–450.

Iwai et al., "Gesture Recognition Using Colored Gloves", Proceedings of ICPR, 1996, Vienna, pp. 662–665.

Akira Torige et al., "Human–Interface by Recognition of Human Gesture with Image Processing: Recognition of Gesture to Specify Moving Direction", IEEE International Workshop on Robot and Human Communication, 1992, pp. 105–110.

Watanabe et al., "A Method of Real–Time Gesture Recognition for Interactive Systems", Proceedings of ICPR, 1996, Vienna, pp. 473–477.

*Primary Examiner*—William A. Cuchlinski, Jr.
*Assistant Examiner*—Marthe Y. Marc-Coleman
*Attorney, Agent, or Firm*—Antonelli, Terry, Stout & Kraus, LLP

[57] ABSTRACT

Noise problems in processing small images or large-granularity images are reduced by representing hand images as rotational vectors calculated using a real-valued centroid. The hand region is therefore sectored independently of pixel quantization. Color segmentation is used to identify hand-color regions, followed by region labelling to filter out noise regions based on region size. Principal component analysis is used to plot gesture models.

18 Claims, 9 Drawing Sheets

SEGMENTED IMAGE

REGION LABELLED IMAGE

START OF "SWIPE"     END OF "SWIPE"

HAND GESTURE RECOGNITION SYSTEM AND METHOD

BACKGROUND OF THE INVENTION

1. Field of the Invention

The invention relates to a hand gesture recognition system and method in which a stream of images, wherein a hand is represented, is received in real time and is processed to represent the hand region in each image as a vector, and the vectors are processed to recognize hand gestures.

2. Description of Related Art

Hand gesture recognition systems have been previously described. U.S. Pat. No. 4,988,981 (Zimmerman et. al) teaches how a glove based device using three sensors could be used as a computer data entry apparatus. This has been expanded upon and several papers, such as Hand Gesture Recognition System Using Multiple Camera (Utsumi et. al), Proceedings ICPR '96, Vienna; Real-Time Self-Calibrating Stereo Person Tracking Using 3-D Shape Estimation from Blob Features (Azarbayeiani et. al), Proceedings ICPR '96, Vienna; and Real-Time Hand Shape Recognition Using Pipe-line Image Processor (Ishibuchi et. at) IEEE Int. Workshop on Robot and Human Communication 1992 have shown that multiple sensors, such as cameras, can be used to find the 3D position of the object, such as a hand. These systems have the disadvantage that they require multiple sensors, which increase the costs of the system, and also mean that complex processes must be performed to integrate the information from these multiple sensors.

The Paper Visual Servoing Using Eigenspace Method and Dynamic Calculation of Interaction Matrices (Deguchi et. al), K. Deguchi & T. Naguchi, Proceedings ICPR '96 Vienna has taught how it is possible to construct 3D images using a single sensor by moving the sensor to different positions and viewing the object. However, this also has the disadvantage that complex data processing is required, as well as a mechanism to move the sensor. It also has the disadvantage that tracking fast moving objects, such as hands, would require that the sensor move at an even faster speed.

Colored gloves as a method to help segment hand shapes in real-time and in real-world conditions have been described in the papers Video-Based Hand-Shape Recognition Using Hand-Shape Structure Model In Real Time (Grobel et al.) Proceedings ICPR '96 Vienna, and Gesture Recognition Using Coloured gloves (Iwai et al.), Proceedings ICPR '96, Vienna. However, these systems use multiple colors within the same glove. The main problem with this approach is that although it makes the position of the fingers of the hand easy to detect, it makes the segmentation of the glove from a real-world environment more difficult as there is more chance of a background color matching the color of the glove. This means that a more elaborate analysis process must be used to correctly identify the fingers and hand. Also, the large number of colors is also reflected in greater processing complexity since the color analysis system must be duplicated for every color.

Use of a single color glove has been described by Human-Interface by Recognition of Human Gesture with Image Processing: Recognition of Gesture to Specify Moving Direction (Akira et al.), IEEE Int. Workshop on Robot and Human Communication 1992. However the segmentation of the gloved hand is by a process of edge detection using high contrast black colored gloves, and the system uses cameras as input devices. The problem with this approach is that in low contrast images it becomes difficult to segment the hand accurately, and if two hands are to be segmented then the processes to differentiate the left and right hand become very complicated.

Single-view based hand gesture systems have been taught by U.S. Pat. No. 5,423,554 (Davis), U.S. Pat. No. 5,454,043 (Freeman) and described by A Method of Real-Time Gesture Recognition for Interactive Systems (Watanabe et al), ICPR '96, Vienna. U.S. Pat. No. 5,423,554 (Davis) describes a color segmentation process by which a user wears colored gloves in order to interact with a virtual reality game. The description in this patent is of tracking movement of the hand, rather than hand shape or gesture recognition. It employs chromakey technology to help segment the hands from the background image.

The Watanabe et al. paper discloses a template approach to real-time gesture recognition, reducing the arm image to that of the orientation of a line. This approach uses a model of the arm to perform gesture recognition, and uses a process similar to template matching to discover what the input gesture is, compared to a set of pre-stored template models.

U.S. Pat. No. 5,291,563 (Maeda) describes a system for detecting objects such as vehicles. This system splits an image in which the objects are represented into sections, and after the sum of the pixels of the objects in each section has been calculated a principal components analysis is performed to extract the key elements. However, this system appears to suffer from a problem which makes it unsuitable for small images. It processes the image data on a pixel-by-pixel basis and thus large noise levels would arise for high granularity images on inexpensive equipment such as standard PC's, or for small images. For example, if the object being segmented moves very slightly, this can move a centroid such as (1.01,0.02) to (1,0) in either nearest integer rounding method. However, if the centroid is (0.49, 0.49) and moves to (0.51,0.51), then using a nearest integer method, the centroid will move from (0,0) to (1,1). The problem with small images is that the number of pixels which cross from one segment into another segment make up a large percentage of the total pixels within that segment. This means that for small images, less than 128×128 pixels, significant noise is generated as the centroid moves across these boundaries. This means that gesture recognition becomes very difficult, and the accuracy is reduced. This problem can be reduced, but not eliminated, by using larger images.

U.S. Pat. No. 5,454,043 (Freeman) describes a hand gesture recognition system on a grey scale image. The hand is segmented using a low pass filter, from which an orientation histogram is constructed, to provide a "Signature Vector" for a single image. It also teaches how these signature vectors can be used to recognise dynamic hand gestures by converting 3-D space-time-orientation maps into 2-D space-time-orientation histograms. A problem with this approach, however, is that the gesture can only be recognised when the dynamic gesture is complete. In order that this system would be able to recognise the degree of rotation for a single hand position, a signature vector for every degree of the hand angle would need to be constructed. In order to which recognise hand degree was closest, the input signature vector would need to be matched to all the stored input vectors. This is a computationally intensive task, and the accuracy of the system will degrade as the number of stored signatures is increased.

SUMMARY OF THE INVENTION

It is therefore an object of the invention to provide a hand gesture recognition system and method which can be performed effectively with relatively low-performance processing circuits.

The invention provides a hand gesture recognition system which includes:

vector processing means for representing a hand which is represented in each image as a rotational vector calculated using a real-valued centroid, whereby the hand is sectored independently of pixel grid quantization; and recognition means for analysing sequences of rotational vectors to recognize hand gestures.

The hand also means a hand covered by a globe.

Accordingly, by basing the rotational vectors upon real-valued centroids, there is a smooth transition from one image to the next and noise is dramatically reduced. This is particularly important where there is a small number of pixels in the image such as in image processing on a conventional microcomputer, for example, for games or graphics applications generally. The invention therefore allows a level of image processing to be performed on such machines which is much greater than has heretofore been the case. This is particularly important for commercial products in which 3D graphics are used.

In one embodiment, the recognition means includes means for performing principal component analysis in which rotational vectors are principal components which are plotted against reference gesture models. This allows a relatively simple representation of a hand gesture for comparison purposes. This is particularly important for real time image processing. It has been found that the use of principal component analysis techniques is particularly effective in combination with the use of rotational vectors calculated using real-valued centroids because of the smooth continuity from one image to the next.

The reference gesture models may be arranged for searching in a hierarchial structure according to their similarities to each other. This provides a fast and efficient search mechanism for real time image processing.

In one embodiment, the hand gesture recognition system further includes color segmentation means for identifying segments in each image having the hand color. Color segmentation is a simple and effective way of identifying a hand segment.

The color segmentation may be performed using a three-dimensional color cone reference template. This is a very simple template and allows fast comparisons to be made.

The pixels may be filtered initially according to two-dimensional color plot comparisons during color segmentation. This allows early elimination of pixels without the necessity for the full cone comparisons to be carried out.

The color segmentation means may include means for indicating when the image environment is too dark or too bright if an excessive proportion of pixels within the cone have a value below a lower darkness threshold or above an upper brightness threshold. In this way, an early indication is provided if the light levels are insufficient or excessive for effective image processing.

In one embodiment, the hand gesture recognition system further comprises filter means for filtering noise regions before vector processing. This is a particularly effective technique with color segmentation and eliminates background segments having a similar color to the hand.

The filter means may comprise means for labelling regions having the hand color and passing to vector processing only the largest such region. This is a very simple way of filtering out the noise regions.

In one embodiment, the vector processing means comprises means for computing a real-valued centroid of the hand initially and subsequently computing the rotational vectors as a function of integer-based vectors computed using origins on pixels adjacent the real-valued centroid. By using integer-based vectors, a relatively simple technique can be used to perform each processing step.

The function of integer-based vectors may be initially computation of interger-based vectors using each of origins (having an interger value) on pixels adjacent the real-valued centroid (i.e. four pixels surrounding the real-valued centroid), subsequently summation of the interger-based vectors and then normalization of sum of the interger-based vectors.

The integer-based vectors may be weighted before summation according to distances of their origins from the real-valued centroid. This provides for a very accurate vector calculation.

In one embodiment, the vector processing means includes means for computing the rotational vectors by caluculating hand sizes extending from the real-valued centroid directly in each of sectors(radial segments), the sectors being obtained by dividing the image in the real-valued centroid as an origin of radial coordinates.

Pixels on sector boundaries are allocated to sectors according to their sub-division between sectors. This allows accurate vector determination with allowance being made for overlap of boundaries and pixels.

The vector processing means may comprise means for pre-defining an array of pixels which fall between upper and lower sector boundary limits.

According to another aspect, the invention provides a hand gesture recognition method comprising the steps of:

receiving a stream of images in real time;

representing a hand represented in each image as a rotational vector calculated using a real-valued centroid of the hand, whereby the hand is sectored independently of pixel grid quantisation; and analysing sequences of rotational vectors to recognize hand gestures.

The vectors may be analysed by performing principal component analysis in which vectors are principal components which are plotted against reference gesture models.

The invention will be more clearly understood from the following description of some embodiments thereof given by way of example only with reference to the accompanying drawings.

DETAILED DESCRIPTION OF THE PREFERRED EMBODIMENTS

Initialy, a hard ware construction of a system of the invention will be described.

Figure 11:
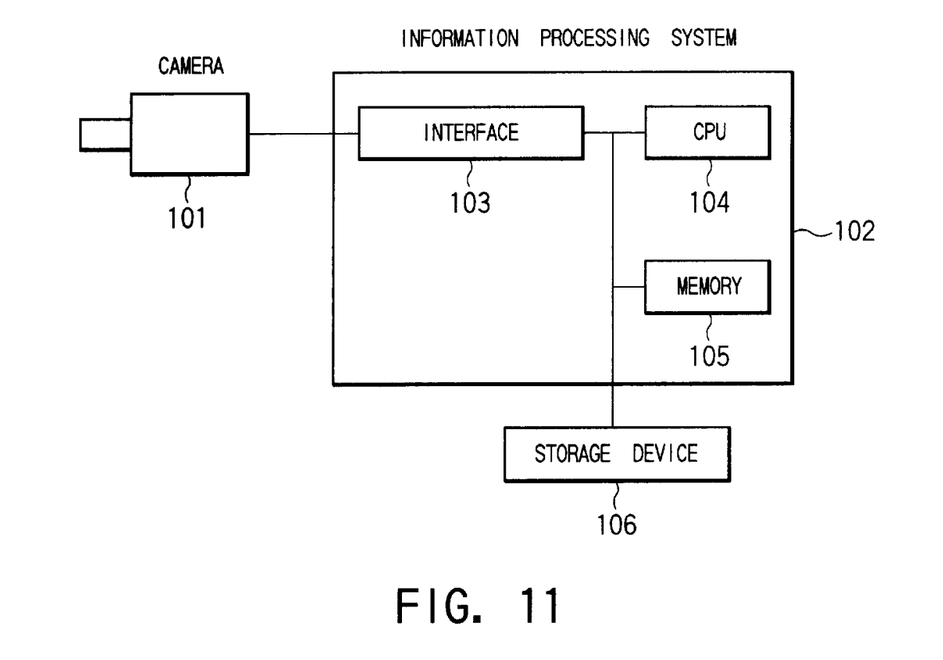
FIG. 11 shows a hard ware construction of a system of the invention.

FIG. 11 shows a hard ware construction of a hand gesture recognition system of the invention.

In FIG. 11, number 101 is a camera for taking a hand gesture. Number 102 is an information processing system, such as PC, for recieving the hand gesture taken by the camera 101 as a stream of images and for recognizing the hand gesture according to the stream of images.

The information processing system 102 comprises a interface portion 103 for receiving the stream of images transmitted from the camera 101, a CPU 104, a memory 105, and a storage device 106 such as CD-ROM or HDD.

The storage device 106 stores a program and data for excuting the hand gesture recognition of the invention. When the program is loaded on the memory 105 and excuted by the CPU 104, the hand gesture recognition of the invention is started.

Figure 1:
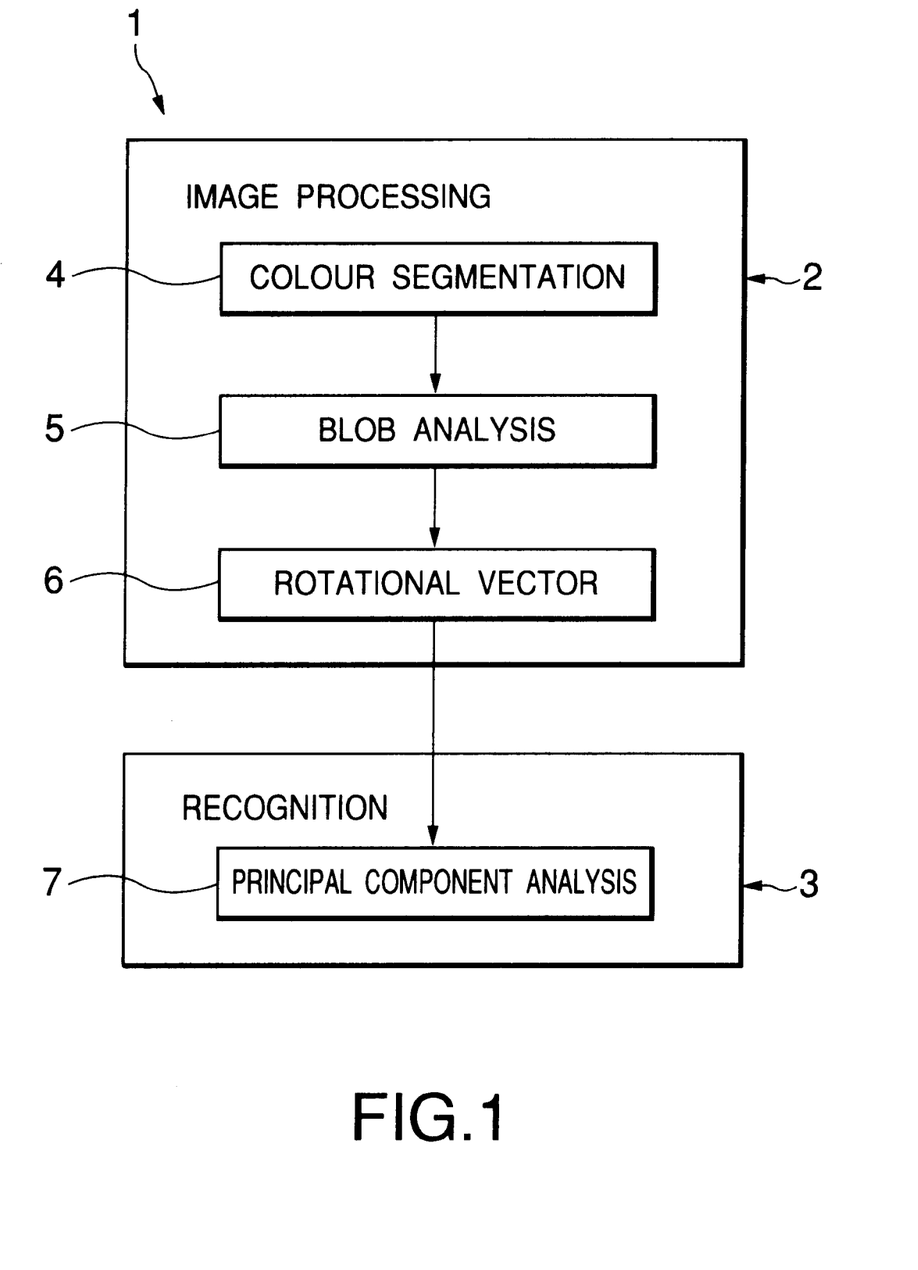
FIG. 1 is a block diagram showing a system of the invention at a high level.

Referring to FIG. 1, an outline of a system 1 of the invention is illustrated. The system 1 has two main sections, namely an image processing section 2 and a recognition section 3. The image processing section 2 is sub-divided into a) a color segmentation sub-section 4 which extracts a colored glove from a complete background, b) a blob analysis sub-section 5 which eliminates noise generated by the color segmentation sub-section, and c) a rotational vector sub-section 6 which converts the segmented image into a form which is distance invariant.

The color segmentation sub-section 4 will be described.

Figure 2:
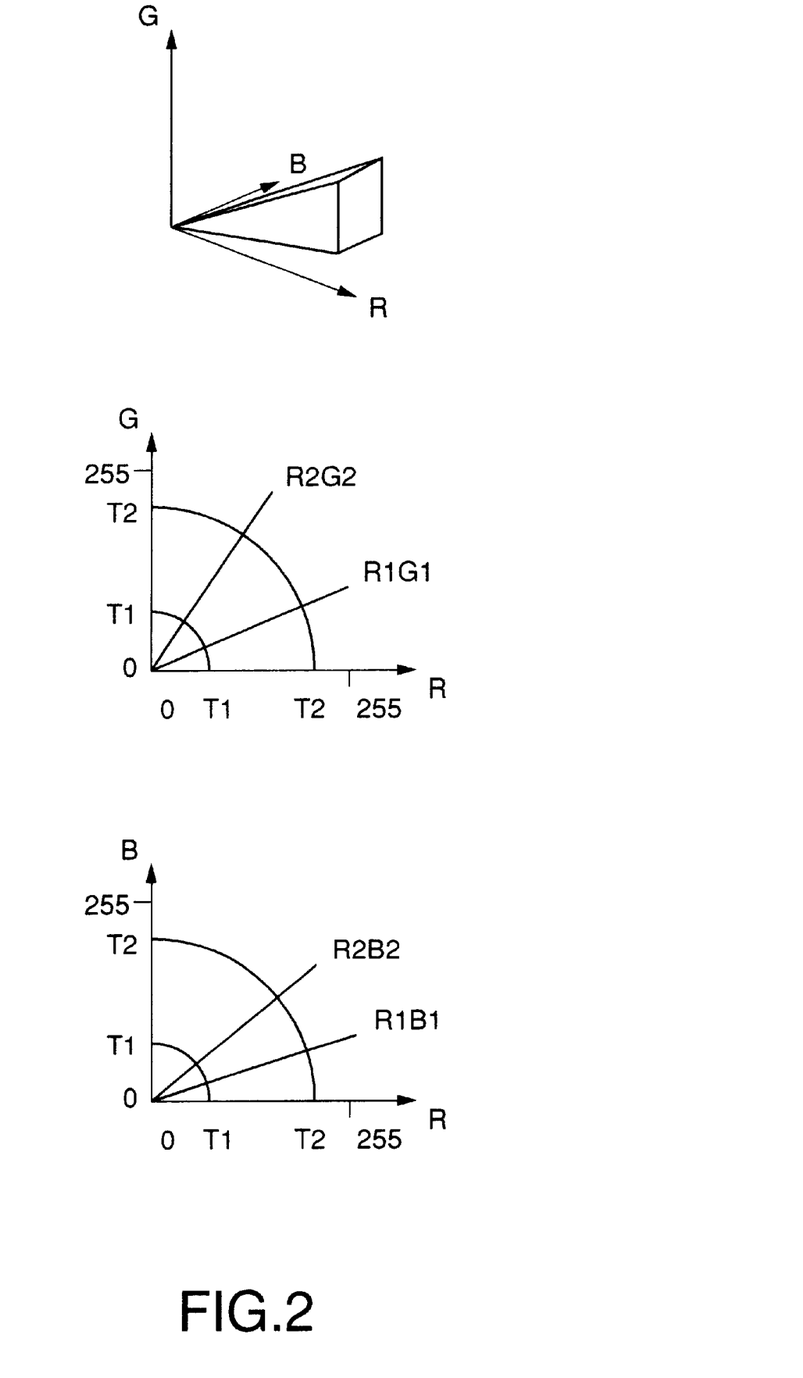
FIG. 2 is a set of graphs showing color segmentation.
Figure 3:
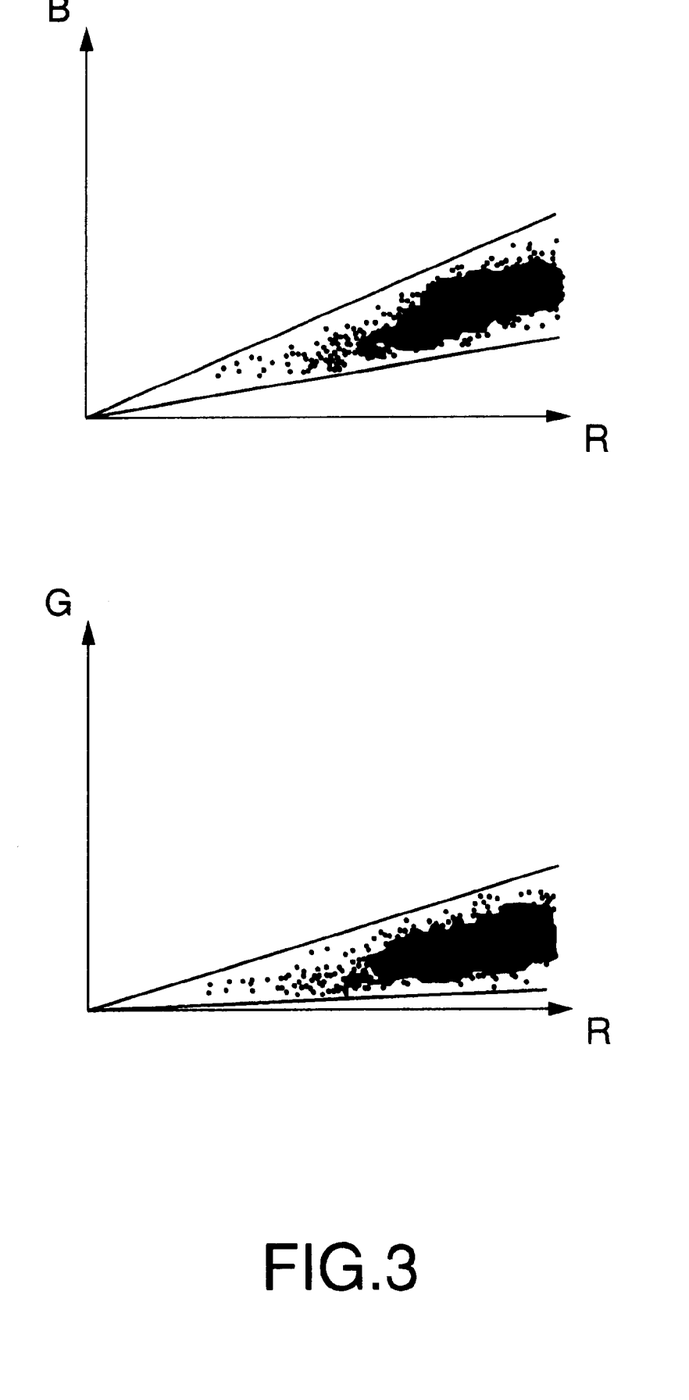
FIG. 3 is a set of graphs showing color segmentation calibration cones.
Figure 4:
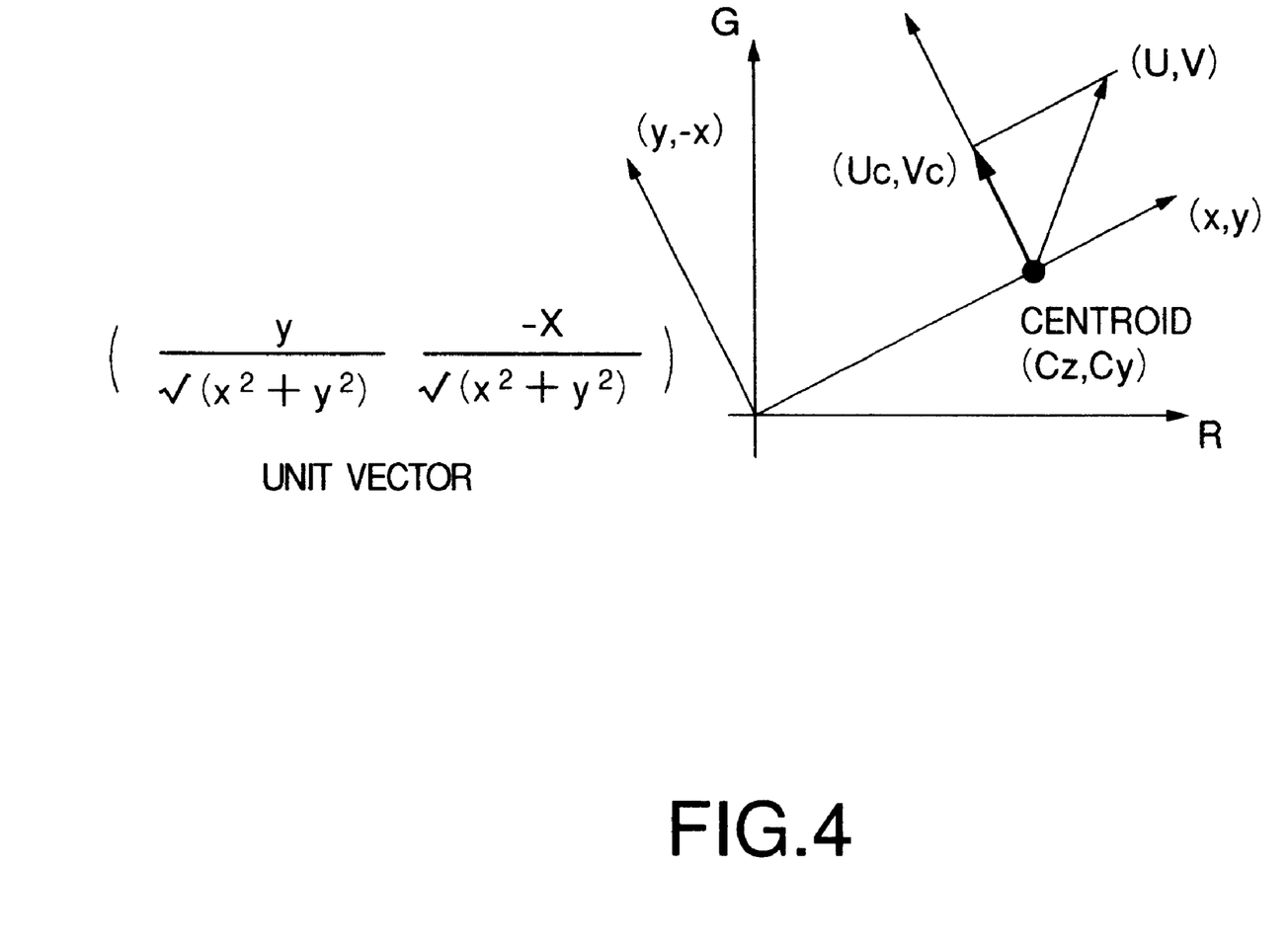
FIG. 4 is a diagram illustrating processing algorithms for color segmentation.

Referring to FIGS. 2 to 4, the manner in which color segmentation is implemented is described. The color segmentation sub-section 4 must be invariant to changes in intensity in the environment, and to achieve this a pyramidal cone calibration setting is used. The advantage of this approach is that it provides a computationally efficient method of color segmentation which gives high accuracy (24 bits) without the requirement for a large amount of memory.

In the pyramidal cone, an RGB color domain is used. The pyramidal cone is constructed by four lines, two in the RG domain, and two in the RB domain. To find if a pixel is within the pyramidal cone, the RGB values of the pixel are compared to these four lines to determine if they lie within the boundary. This can be found very efficiently by simply finding the sign of the determinant between the RG value of the input pixel and the RG value of one of the bounding lines.

If the sign is correct, then this will indicate that the input pixel lies at the correct side of the bounding line. By comparing the point with all four bounding lines it is possible to discover if the input point is within the pyramidal cone. If at any stage in the computation the pixel is found to be at the wrong side of a bounding line then the computation can be terminated early, saving unnecessary computation. If the point is found to be within the cone, a grey scale value of the point as a function of the RGB values is generated by adding the R, G and B values together and dividing by 3.

The system determines when the environment becomes too dark or too bright. This is achieved by processing the values of pixels with pre-set areas, such as within an arc drawn around the origin if an excessive proportion P1 of pixels have a value below a lower threshold T1 the environment is too dark. If an excessive proportion P2 have a value above an upper threshold T2 the environment is too bright. For example the following conditions should be satisfied:

$$\text{Too dark:} \quad N\left(\sqrt{Rx^2 + Gx^2} < T_1\right) > P_1 \qquad \text{Equation 1}$$

$$\text{Too bright:} \quad N\left(\sqrt{Rx^2 + Gx^2} > T_2\right) > P_2$$

for pixel x inside the cone having values Rx, Gx, Bx. N is a function indicating the number of pixels satisfying condition in ( ). The lower threshold T1 and the upper threshold T2 are represented in FIG. 2 as the inner and outer arcs around the origin. In this diagram R1 G1 is the upper cone limit and R2 G2 is the lower cone limit in the R G plane, and likewise for R1 B1 and R2 B2 in the R B plane.

The condition to determine if a pixel is within the cone is:

$$R1\ Gx - Rx\ G1 \leq 0 \text{ and}$$

$$R2\ Gx - Rx\ G2 \geq 0 \qquad \text{Equation 2}$$

and similarly for the second plane.

A method of making the pyramidal cone will be described.

Initially, a calibration program is used to collect color templates and to process them in order to extract the bounding lines.

FIG. 3 shows the results from the calibration program. The results show two graphs, the G vs. R, and is B vs. R. The points are acquired over several frames using an interactive data gathering program. This program prompts the user to place the gloved hand in a series of positions within the camera view, and which the user holds his/her hand still, the program stores small areas of gloved colored pixels onto hard disk to be analyzed.

The lines on the graphs of FIG. 3 indicate the bounding lines of the pyramidal cone. These are determined by using some simple statistical algorithms. It is assured that all pyramidal cones have a vertex at the origin, so this will be one point of the line. Each set of data points(the small areas) has its origin computed to find the mean RG value and mean RB value.

A line is then projected from the origin to a centroid of the small areas. It is then necessary to find the perpendicular to this line. We measure the standard deviation σ of the points with respect to the perpendicular in order to get the optimum position of the bounding lines. FIG. 4 shows the basic mathematics. The Centroid (Cx, Cy) and the origin define a vector, known as (x, y). The perpendicular to this vector is (y, −x) but this must be scaled to a unit vector and hence the unit vector is $(y/(x^2+y^2), -x/(x^2+y^2))$.

It is possible to project any input pixel onto this unit vector by performing a dot product between the unit vector and the input pixel. This is shown diagrammatically in FIG. 4 as (U, V) is mapped to (Uc, Vc). Then, by calculating the standard deviation σ of all the input points in this new co-ordinate system, it is possible to find an interval which covers the majority of the points and excludes outliers. It was found that an interval of (−3σ, 3σ) was optimum to obtain good segmentation results from the preferred embodiment.

The blob analysis sub-section 5 will be described.

Figure 5:
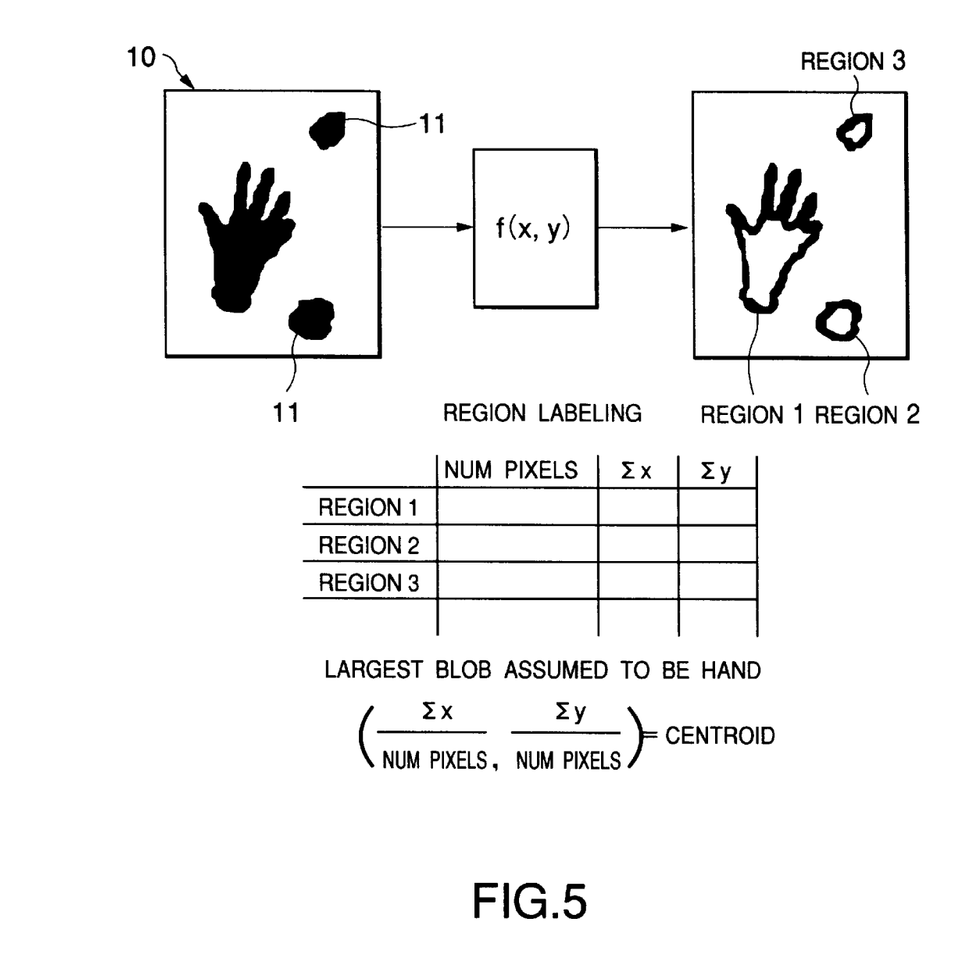
FIG. 5 illustrates region labelling to filter out noise regions.

The segmented image 10 shown in FIG. 5 shows one of the major problems with the color segmentation approach, namely the inclusion of background object segments 11 which also have colors which fall in the pyramidal color cone. In order to reduce this effect, blob analysis or region labelling, is used. Region labelling is performed on a binary image, and in the case of the preferred embodiment, it was assumed that any pixel having a non-zero value was an active pixel (1), and any pixel having a zero value was inactive (0).

Figure 6:
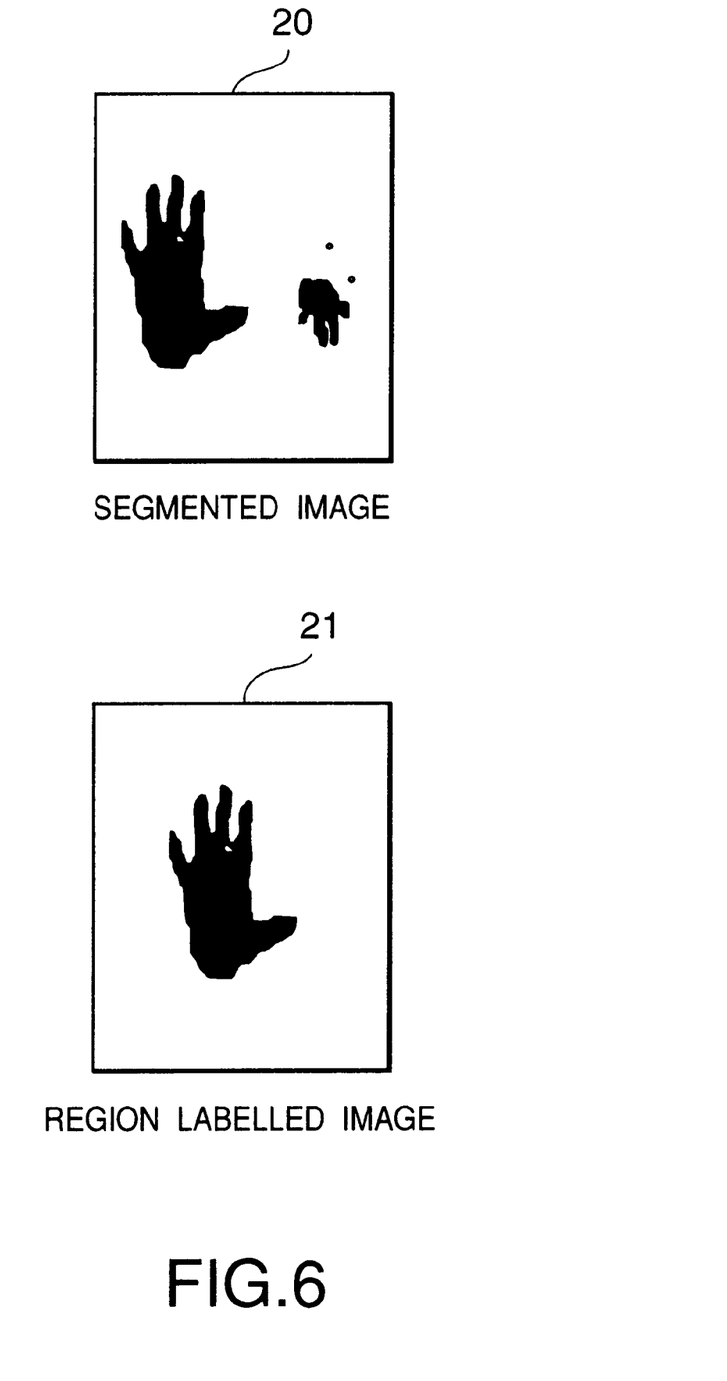
FIG. 6 shows images before and after region labelling.

The region labelling method is used to label groups of adjacent pixels into groups or regions. The largest group is assumed to be the hand region, and only the pixels belonging to this group are allowed to pass to the next subsection 6. Whilst the labelling is taking place, the image processor automatically calculates the number of pixels as well as $\Sigma y$ and $\Sigma x$ for each label. Once all pixels have been labelled, all equivalences are calculated and the number of distinct regions is found. The region which has the largest number of pixels is assumed to be the hand region and using $\Sigma y$, $\Sigma x$ the centroid of this region can be found. FIG. 6 shows a pre-processed image 20 and a post-processed image 21 to illustrate the results.

The rotational vector sub-section 6 will be described.

In the preferred embodiment the camera is situated very close to the user, since it is placed on top of the monitor and points towards the user. A problem with this situation is that when the hand comes close to the camera its image will become very large and this will cause a scaling problem. There may be an accompanying change in intensity which will also have to be overcome. Therefore, we must make the system invariant to changes in the size and brightness of the hand-image. This is achieved using a rotational vector technique.

The rotational vector technique involves a transform from the conventional pixel grid representation to an angular representation. First the centroid of the hand image is calculated and this is used as the origin of a radical coordinate system. The image is then divided into 16 equally spaced radial segments and the sum of the pixel values within each segment is calculated. The values are then normalized by dividing each by the total sum of all the pixel values in the segmented hand image. (If a binary image is being used we simply count the number of non-zero pixels in each segment and divide by the total number of non-zero pixels in the image).

Figure 7:
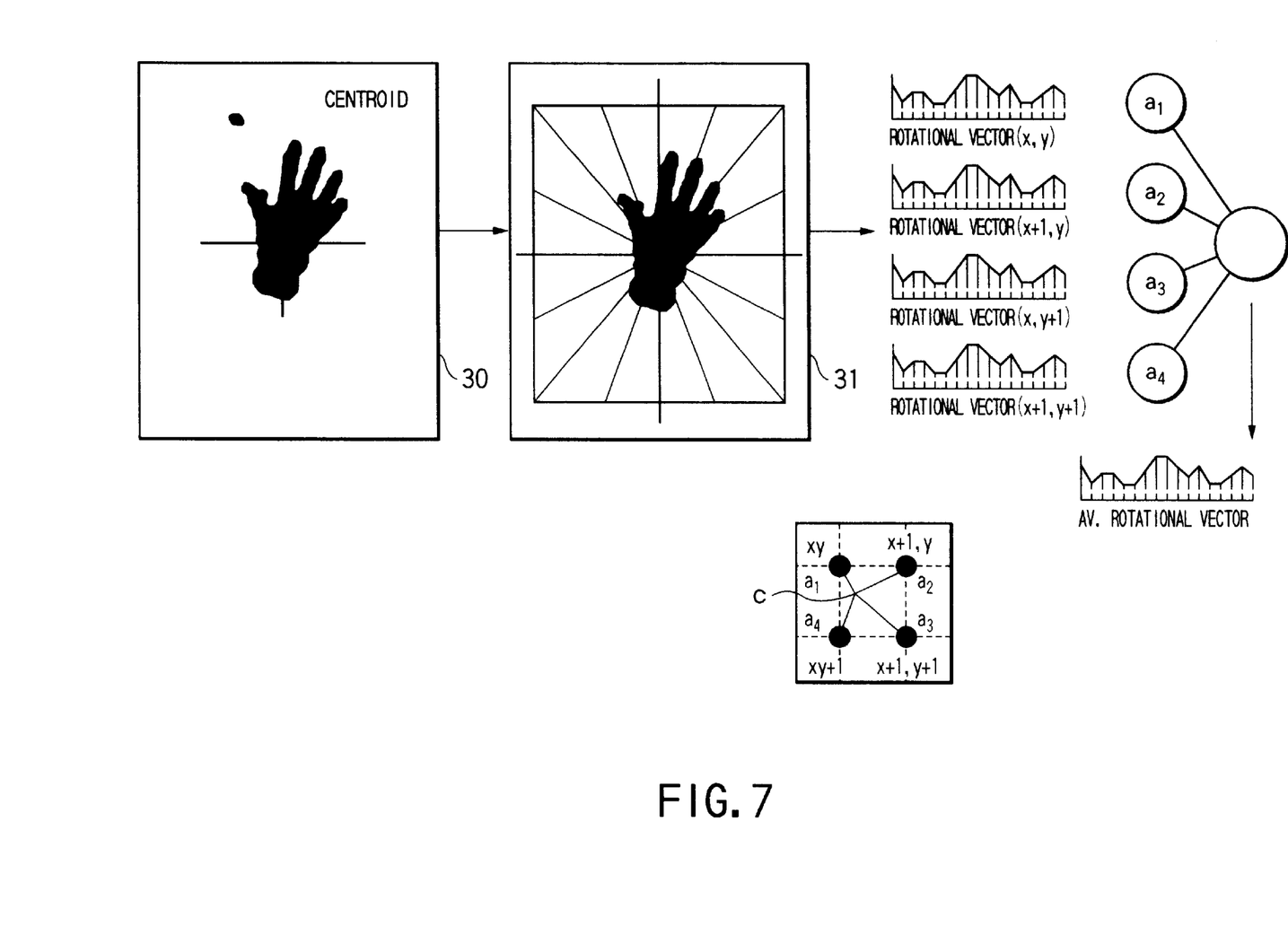
FIG. 7 is a set of diagrams showing summation of neighbouring rotational vectors.

The hand image is now described by this 16-element vector. FIG. 7 shows the centroid in a display 30 and the vector sectors in a display 31. The segmented image and the centroid, calculated from the region labelling/blob analysis, are inputted to the rotational vector sub-section 6.

The centroid is not an integer number and hence it falls between pixels (sub-pixel) and has a real, non-integer value. Experimentation using conventional approaches, for example rounding the real values to either the lowest integer, or the nearest integer, caused noise problems in subsequent stages of the algorithm. Experiments in which the hand was kept perfectly still demonstrated that the centroid still drifted by several pixels, and this led to problems when the rotational vector was produced.

One of the problems with the implementation on, for example, a PC, is that the limited CPU performance means that the image size must be kept small, usually 64×64 pixels. The area of the hand within this area is typically of the order of 20×24 pixels, giving a total number of 480 pixels.

Another problem with the sector generation is that an inner core of pixels must be disregarded. This is because they fall into more than one sector and it is difficult to allocate the pixels to any particular segment without making the pixels in each sector unbalanced. Therefore they are disregarded. The size of this area is dependent upon the number of sectors, but for a 16-sector rotational vector, an inner core of 5×5 pixels must be disregarded. Therefore, typically, the number of pixels to be allocated is of the order of 455. If these pixels are equally allocated amongst the 16 sectors then each sector will get 28 pixels. If the centroid should move by only 1 pixel, then in the worst case as many as 6 pixels may move from one sector to another, producing a 21% change in pixel number. This is mainly a consequence of having to use such small images.

Therefore the invention provides two related strategies to overcome this problem. A first strategy is for obtaining a rotational vector which has a real-valued centroid as an origin. A second strategy is for allocating inner core pixels to any particular segment without making the pixels in each sector unbalanced.

The first strategy will be described.

FIG. 7 shows location of a real-valued centroid of among four pixels which are located at integer points a1(x, y), a2(x+1, y), a3(x+1, y+1), and a4(x, y+1). Initially, four rotational vectors for the four pixels will be computed. Then a rotational vector for the real-valued centroid will be computed.

Namely, the rotational vector for a real-valued centroid is computed by first obtaining four rotational vectors with the origin located at each of the integer points a1, a2, a3 and a4 around the real-valued centroid, then weighting each of the four vectors according to the distance of the origin (the integer point) from the real-valued centroid, and finally adding all four rotational vectors together. This can be mathematically expressed as, $$s = \sum_{i=1}^{4} W_i I_i \qquad W_i = \frac{1/a_i}{\sum_{j=1}^{4} 1/a_j} \qquad \text{Equation 3}$$

where S is the final rotational vector, $I_i$ are the four vectors with the integer-valued origins and $W_i$ are the corresponding weighting factors. A very important point is that the value of S changes smoothly as the real valued centroid changes. This process is very effective, but in some instances excessive computation is required. Accordingly, a variation of this approach is to directly compute the rotational vector from the real-value centroid C.

The second strategy will be described.

Figure 8:
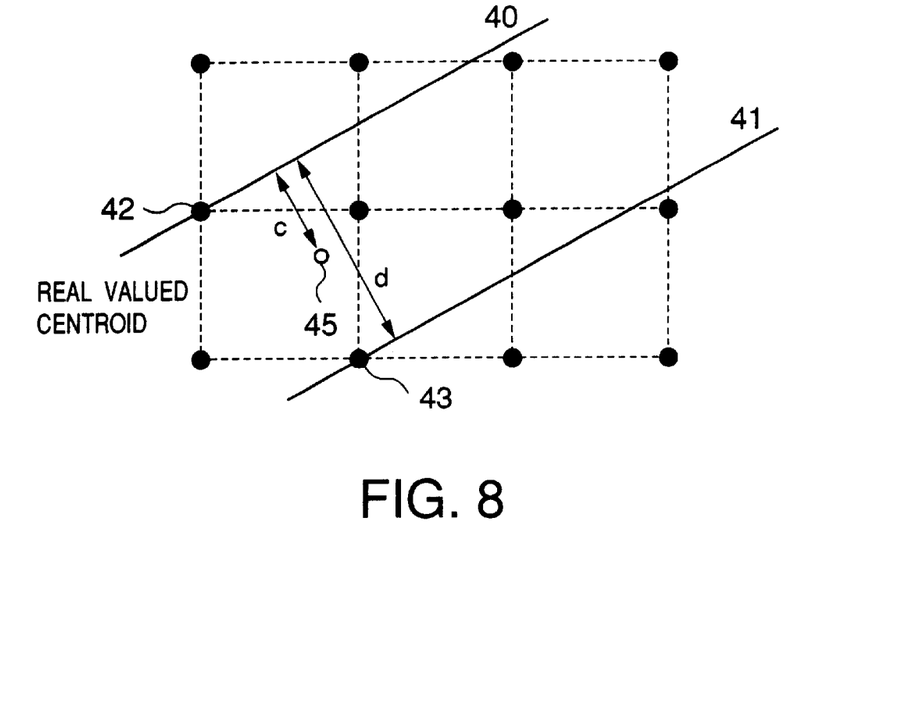
FIG. 8 is a diagram showing how an array of sector boundary pixels is determined for efficient vector computation.

An array is computed which indicates which pixels fall on the sector boundaries and are subject to change. The values of these pixels are summed separately from the others and multiplied by appropriate weighting factors. The full sector sum is computed by summing the full internal pixels (exception of the "weighted" pixels) sum and the "weighted" pixels sum.

FIG. 8 shows the uppermost 40 and lowermost 41 positions which a boundary typically can have, passing through corners 42 and 43 of the pixel within which the centroid 45 falls. The pixels which lie between these two boundaries will be included in the upper sector when the boundary lies at its lowermost limit the vice versa.

To determine the weighted sum, we compute the sum of the pixel values lying between the boundaries . We then multiply this by a weighting factor w depending on the position of the centroid in between the two boundaries:

$$W = c/d \qquad \text{Equation 4}$$

where c is the perpendicular distance of the centroid from the upper boundary and d is the perpendicular distance between the two boundaries.

We add the following quantities U and L to the upper and lower sectors respectively.

$$U = wB$$

$$L = B - U \quad \text{Equation 5}$$

where B is the sum of the pixel values between the boundaries. A procedure similar to this is applied to all the sector boundaries. This procedure again results in a rotational vector whose value changes smoothly as the centroid changes.

The recognition section 3 will be described.

The recognition section 3 includes a principal component analysis section 7. The principal component analysis section 7 performs the recognition and differs from the image processing section 2 in that it actually recognizes the hand gestures.

In hand gesture recognition, the hand image changes shape because the hand is moving through space and changing its position with respect to the camera, or because the hand itself is changing shape. Recognizing such continuous hand gestures using a static template matching approach would be very difficult because of the vast number of templates required. However, a simple generalization of template matching solves this problem.

Figure 9:
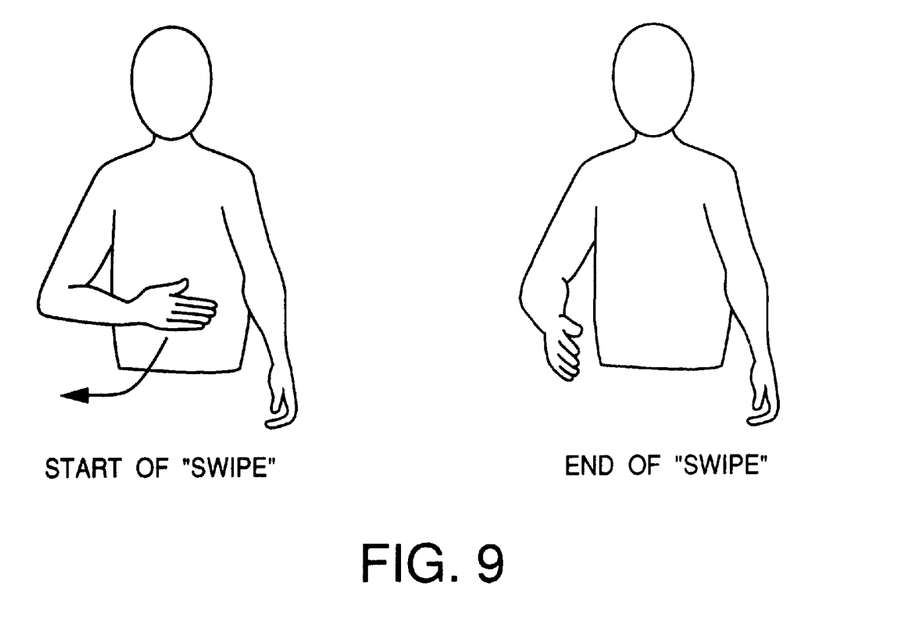
FIG. 9 is a pair of diagrams illustrating a hand gesture "swipe"

Let us consider a particular continuous gesture the "swipe" gesture shown in FIG. 9. Each hand-shape generated as part of this gesture will define a point in N-dimensional feature space. Points generated by similar hand-shapes will be close together and those generated by dissimilar hand-shapes will be further apart. As the hand moves through this gesture it describes a continuous trajectory in N-dimensional feature space. If the gesture is repeated many times it will generate a slightly different trajectory each time due to differences in wrist angle or elbow angle. But it is likely that all trajectories will lie close together in feature space and will probably form a continuous surface.

We would like to visualize this surface. This is difficult since N is usually rather large typically 16 or 32. However, the surface itself may not occupy all N dimensions and may lie in a lower dimensional sub-space. To find this we use a statistical technique called principal components analysis (PCA). This technique finds vectors within feature space which carry the most information about the data. Each vector is known as a "principal component". Usually only a small number (<<N) of principal components carry most of the information.

Figure 10:
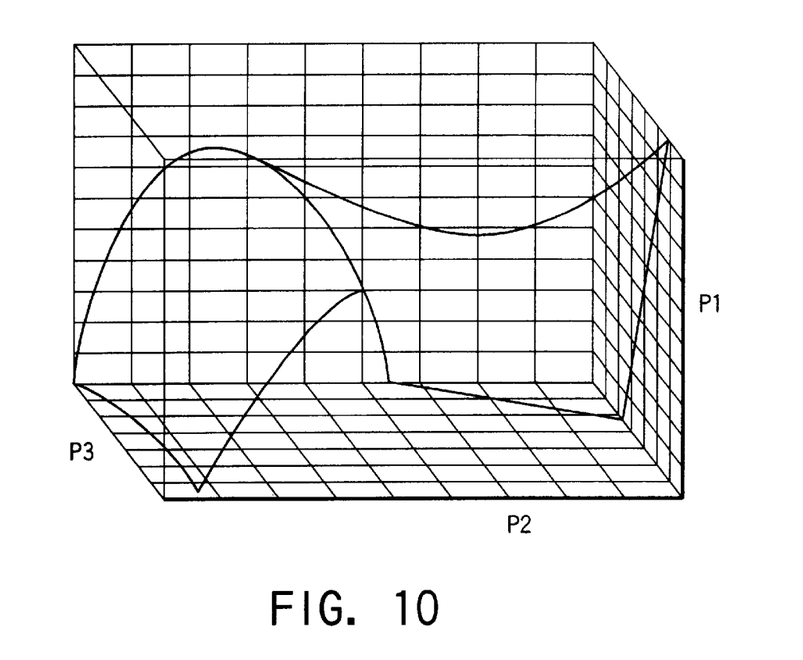
FIG. 10 shows a 3D hand gesture "swipe representation.

When the data is analysed using principal component analysis, it is found that the majority of the information about the gesture is carried by the top three principal components. If the rotational vectors of all the hand-shapes which make up the "swipe" gesture are processed using principal component analysis, and the top three principal components are plotted in a 3D graph 50, shown in FIG. 10, then these points are found to lie upon a surface. It is possible to find an equation which defines this surface, which gives a continuous equation for the hand gesture. Different points on this surface correspond to different angles of the hand with respect to the horizontal and vertical axes. Using this equation it is possible, from any unknown input vector, to find the nearest point on this surface to the input vector. By measuring the distance of the input point from the nearest point on the surface, a degree of confidence can be found. If a hand gesture different from a "swipe" is inputted into the system, then its rotational vector will lie within another region of the N-dimensional space. Therefore, when the principal components are extracted, the point will not lie close to the surface. It is therefore possible to reject this as not being the correct hand shape for the "swipe" gesture.

If a hand-shape belonging to "swipe" is inputted into the system it is also possible to find the angle of the hand with respect to both the vertical and horizontal axes from the position of the corresponding point of the surface in principal component space.

It is possible to make the above computation more efficient by use of symmetry. Since hand-shapes at opposite ends of the "swipe" gesture are mirror images of each other, the principal components for the two sides of the gesture will also be mirror images. We can use this fact to cut down the amount of principal component data which must be stored and to simplify the comparison of a new input vector with the surface in principal component space.

Models of different hand gestures are built so that in real time, the unknown rotational vector can be compared to all models, the correct hand shape being the one with the smallest distance. These models are arranged in a hierarchical structure according to their similarity to one another. This tree-structure makes the search more efficient since it is not necessary to search all of the models exhaustively.

The recognized gestures are used to generate simulated keystrokes inputted to an application. However, as an alternative, the gesture recognition steps could be incorporated in the application.

It will be appreciated that the invention provides a system and method which allows conventional hardware such as PCs to recognize continuous hand gestures in real time by overcoming the large noise problems attendant on small images and large granularity. It could thus be applied by suitable programming of a PC with a video camera and frame grabber board. Such PCs will shortly be available as standard.

Recognition of hand gestures by such hardware allows conventional input devices such as the keyboard and the noise to be circumvented. This is important for 3D games and graphics applications, particularly with head-mounted displays in which the keyboard cannot be seen.

What is claimed is:

1. A hand gesture recognition system comprising:
   input means for receiving a stream of images in real time; and
   processing means for representing a hand which is represented in each image as a vector and for processing the vectors to recognize hand gestures,
   wherein said processing means comprises:
      vector processing means for representing the hand in each image as a rotational vector which is calculated using a real-value centroid of a region representing the hand in which the region is divided into a plurality of sectors through the real-value centroid by calculating the ratio of the number of pixels within each sector representing the color of the hand to the total number of pixels of the color of the hand within the region as an element vector for each section, wherein the element vectors correspond to the rotational vector, and whereby the hand is sectored independently of pixel grid quantization, and
      recognition means for analyzing sequences of rotational vectors to recognize hand gestures by performing a principal component analysis in which the rotational vectors are principal components which are plotted against reference gesture models.

2. A hand gesture recognition system as claimed in claim 1, wherein said recognition means comprises a principal component analysis section for performing said principal component analysis in which rotational vectors are principal components which are plotted against reference gesture models.

3. A hand gesture recognition system as claimed in claim 2, wherein said reference gesture models are arranged for searching in a hierarchical structure according to their similarities to each other.

4. A hand gesture recognition system as claimed in claim 1, wherein said processing means further comprises:
   color segmentation means for identifying segments in each image having the hand color.

5. A hand gesture recognition system as claimed in claim 4, wherein said color segmentation means identifies segments in each image having the hand color using a three-dimensional color cone reference template.

6. A hand gesture recognition system as claimed in claim 5, wherein said color segmentation means filters pixels initially according to two-dimensional color plot comparisons so as to identify pixels which are in the three-dimensional color cone.

7. A hand gesture recognition system as claimed in claim 5, wherein said color segmentation means comprises:
   means for indicating when the image environment is too dark or too bright if an excessive proportion of pixels within the three-dimensional color cone have a value below a lower darkness threshold or above an upper brightness threshold.

8. A hand gesture recognition system as claimed in claim 4 wherein said processing means further comprises:
   filter means for filtering noise regions before vector processing.

9. A hand gesture recognition system as claimed in claim 8, wherein said filter means comprises:
   means for labeling regions having the hand color and passing to vector processing only the largest such region.

10. A hand gesture recognition system as claimed in claim 1, wherein said vector processing means comprises:
    means for computing a real-value centroid of the hand initially and subsequently computing the rotational vector as a function of integer-based vectors computed using origins on pixels adjacent the real-value centroid.

11. A hand gesture recognition system as claimed in claim 10, wherein the function of integer-based vectors is computation of integer-based vectors initially using each or origins on pixels adjacent to the real-value centroid, subsequently summation of the integer-based vectors and then normalization of sum of the integer-based vectors.

12. A hand gesture recognition system as claimed in claim 11, wherein the integer-based vectors are weighted before summation according to the distances of their origins from the real-value centroid.

13. A hand gesture recognition system as claimed in claim 10, wherein the integer-based vectors have origins on four pixels surrounding the real-value centroid.

14. A hand gesture recognition system as claimed in claim 1, wherein said vector processing means comprises:
    means for computing the rotational vectors by calculating hand size extending from the real-value centroid directly in each of radial segments, said radial segments being obtained by dividing the image in the real-value centroid as an origin of radial coordinates.

15. A hand gesture recognition system as claimed in claim 14, wherein pixels on sector boundaries are allocated to sectors according to their sub-division between sectors.

16. A hand gesture recognition system as claimed in claim 15, wherein said vector processing means comprises:
    means for pre-defining an array of pixels which fall between upper and lower sector boundary limits.

17. A hand gesture recognition method comprising the steps of:
    receiving a stream of images in real time;
    representing a hand in each image as a rotational vector which is calculated using a real-value centroid of a region representing the hand in which the region is divided into a plurality of sectors through the real-value centroid by calculating the ratio of the number of pixels within each sector representing the color of the hand to the total number of pixels of the color of the hand within the region as an element vector for each section, wherein the element vectors correspond to the rotational vector, and, whereby the hand is sectored independently of pixel grid quantization, and
    analyzing sequences of rotational vectors to recognize hand gestures by performing a principal component analysis in which the rotational vectors are principal components which are plotted against reference gesture models.

18. A hand gesture recognition method as claimed in claim 17, wherein said reference gesture models are arranged for searching in a hierarchical structure according to their similarities to each other.

* * * * *